United States Patent
Chen et al.

(10) Patent No.: US 7,944,653 B2
(45) Date of Patent: May 17, 2011

(54) SELF FAULT-DETECTION CIRCUIT FOR GROUND FAULT CIRCUIT INTERRUPTER

(75) Inventors: Wusheng Chen, Yueqing (CN); Fu Wang, Yueqing (CN); Peicheng Liu, Yueqing (CN)

(73) Assignee: General Protecht Group, Inc., Yueqing, Zhejiang (CN)

( * ) Notice: Subject to any disclaimer, the term of this patent is extended or adjusted under 35 U.S.C. 154(b) by 463 days.

(21) Appl. No.: 12/143,125

(22) Filed: Jun. 20, 2008

(65) Prior Publication Data

US 2009/0180222 A1 Jul. 16, 2009

(30) Foreign Application Priority Data

Jan. 14, 2008 (CN) .......................... 2008 1 0000686

(51) Int. Cl.
*H02H 3/00* (2006.01)

(52) U.S. Cl. ........................................................ 361/42

(58) Field of Classification Search .................... 361/42, 361/45, 46, 50, 127, 117, 115

See application file for complete search history.

(56) References Cited

U.S. PATENT DOCUMENTS

| 5,418,678 | A | * | 5/1995 | McDonald | 361/46 |
| 5,661,623 | A | * | 8/1997 | McDonald et al. | 361/42 |
| 6,807,036 | B2 | * | 10/2004 | Baldwin | 361/42 |
| 2002/0008950 | A1 | * | 1/2002 | Kim et al. | 361/42 |
| 2004/0004801 | A1 | * | 1/2004 | Bonilla et al. | 361/115 |
| 2006/0198066 | A1 | * | 9/2006 | Chen et al. | 361/42 |
| 2007/0164750 | A1 | * | 7/2007 | Chen et al. | 324/527 |

* cited by examiner

*Primary Examiner* — Jared J Fureman
*Assistant Examiner* — Angela Brooks
(74) *Attorney, Agent, or Firm* — Tim Tingkang Xia; Morris, Manning & Martin, LLP

(57) ABSTRACT

A self fault-detection circuit for a ground fault circuit interrupter comprising: (i) a Metal Oxide Varistor (MOV) fault detection unit for detecting a fault condition of the MOV, and sending a first trigger signal if a fault condition of the MOV is detected, (ii) a trip circuit fault detection unit for detecting a fault condition of a trip circuit, and sending a second trigger signal if a fault condition of the trip circuit is detected; and (iii) a fault reaction unit for receiving at least one of the first trigger signal and the second trigger signal, and responding to the first and second trigger signals with an action, when at least one of the first and the second trigger signals is received by the fault reaction unit, the fault reaction unit indicates that at least one fault condition exists in the ground fault circuit interrupter.

5 Claims, 2 Drawing Sheets

SELF FAULT-DETECTION CIRCUIT FOR GROUND FAULT CIRCUIT INTERRUPTER

CROSS-REFERENCE TO RELATED PATENT APPLICATION

This application claims priority of Chinese Patent Application No. 200810000686.9, filed on Jan. 14, 2008, entitled "Self Fault-Detection Circuit for Ground Fault Circuit Interrupter," by Wusheng CHEN, Fu WANG, and Peicheng LIU, the disclosure of which is incorporated herein by reference in its entirety.

FIELD OF THE PRESENT INVENTION

The present invention generally relates to real time detection of fault with an alarming device of a ground fault circuit interrupter. More particularly, the present invention relates to self fault-detection circuit for ground fault circuit interrupter.

BACKGROUND OF THE PRESENT INVENTION

Leakage current protection can be divided into two categories according to their functionalities: ground fault circuit interrupter (hereinafter "GFCI") and arc fault circuit interrupter (hereinafter "AFCI"). In order to achieve the goal of leakage current protection, a leakage current protection device used for appliances comprises at least two components: a trip mechanism and a leakage current detection circuit. The trip mechanism comprises a silicon controlled rectifier (hereinafter "SCR"), trip coil, and trip circuit interrupter device. The leakage current detection circuit comprises induction coils, a signal amplifier and a controller.

The operating principle of a GFCI used for appliances is as follows. In a normal condition, the electric current on a hot wire of an electrical socket should be the same as the electric current on a neutral wire in the same electrical socket. When a leakage current occurs, there exists a current differential between the hot wire and the neutral wire of the electrical socket. The inductive coil of the leakage current protection device monitors the current differential and transfers the current differential into a voltage signal. The voltage signal is then amplified by the signal amplifier and sent to the controller. If the current differential exceeds a predetermined threshold, the controller sends a control signal to the trip circuit interrupter to cut off the connection between the AC power and the appliance to prevent damage caused by the leakage current.

For an AFCI used for appliances, in a normal condition, the electric current on a hot wire of an electrical socket should be the same as the electric current on a neutral wire in the same electrical socket, and the variation of both the electric current is same. When an arc fault occurs due to aging or damages of the AFCI device, the current or voltage between the hot wire and the neutral wire of the electrical socket exhibits a series of repeated pulse signals. The inductive coil of the arc fault protection device detects the pulse signals and converts the pulse signals to a voltage signal. The voltage signal is amplified by the signal amplifier and sent to the controller. If the amplitude of the pulse signals or the their occurring frequency exceed certain predetermined threshold, the controller sends a control signal to the trip circuit interrupter to cut off the connection between the AC power and the appliance to prevent further damage caused by the arc fault.

Leakage current protection devices have been widespreadly used because of their superior performance. However, the leakage protection devices may fail to provide such leakage current protection, if they are installed improperly and/or they are damaged due to aging. If a faulty controller can not output a correct control signal, or a trip mechanism fails to cut off the connection between the AC power and the appliance, the leakage current protection device will not be able to provide the leakage current protection, which may cause further damages or accidents. Although most leakage current protection devices are equipped with a manual testing button, usually, users seldom use the manual testing button. Therefore, the leakage current protection devices need an additional circuit to automatically detect malfunctions, faults or the end of the life of such devices. The great relevance would be gained if a leakage current protection device is capable of automatically detecting a fault therein or its end of the life, and consequently alerting a user to take an action including repairing or replacing the leakage current detection circuit.

For example, it is well known that Metal Oxide Varistor (hereinafter "MOV") is a key component of a ground fault circuit interrupter. The MOV is usually connected to the power input lines in parallel to absorb surge voltage. The MOV electronic characteristics may change due to following reasons: low quality product, aging, temperature and humidity fluctuation and so on. Under certain circumstances, it may explode and catch fire.

Currently, the solution to above mentioned issue is to improve the quality of the MOV and to extend the life of the MOV. However, it will not solve the problem of aging MOV causing fault. Therefore, in order to ensure the proper working functions of a GFCI, a self fault-detection of GFCI's key components such as MOV, and trip mechanism is desirable.

Therefore, a heretofore unaddressed need exists in the art to address the aforementioned deficiencies and inadequacies.

SUMMARY OF THE PRESENT INVENTION

In one aspect, the present invention relates to a self fault-detection circuit for a ground fault circuit interrupter having a line input with a phase terminal and a neutral terminal, and a load output with a phase terminal and a neutral terminal. In one embodiment, the self fault-detection circuit has: (i) a Metal Oxide Varistor (MOV) fault detection unit configured for detecting a fault condition of the MOV, and sending a first trigger signal if a fault condition of the MOV is detected, (ii) a trip circuit fault detection unit configured for detecting a fault condition of a trip circuit, and sending a second trigger signal if a fault condition of the trip circuit is detected, and (iii) a fault reaction unit for receiving the first trigger signal from the MOV fault detection unit and the second trigger signal from the trip circuit fault detection unit, and responding to the first and the second trigger signals with an action. When at least one of the first and the second trigger signals is received by the fault reaction unit, the fault reaction unit indicates that at least one fault condition exists in the ground fault circuit interrupter.

In one embodiment, the trip circuit has: (i) a trip coil having a first terminal and a second terminal, wherein the first terminal of the trip coil forms a first terminal of the trip circuit; (ii) a sixth silicon controlled rectifier (SCR) having an anode connected to the second terminal of the trip coil, a cathode and a gate, and (iii) a current limiting fifth resistor having a first terminal and a second terminal, wherein the first terminal of the fifth resistor connected to the cathode of the sixth SCR, and the second terminal of the fifth resistor forming a second terminal of the trip circuit. The value of the fifth resistor is chosen such that the current through the trip circuit is not strong enough to cause the trip coil to trip.

In one embodiment, the MOV fault detection unit includes: (i) an MOV having a first terminal and a second terminal, wherein the first terminal of the MOV is connected to the phase terminal of the line input, and the second terminal of the MOV is connected to the neutral terminal of the line input through a movable contact point and a stationary contact point, with the connection between the movable contact point and the stationary contact point controlled by the trip circuit, and (ii) an MOV fault detection device. The MOV fault detection device has: (a) an MOV leak current detection coil adapted for detecting the leak current going through the MOV, and (b) a processor adapted for receiving the detected leak current from the MOV, comparing the detected leak current with a predetermined threshold and sending out the first trigger signal if the detected leak current from the MOV is greater than the predetermined threshold.

In one embodiment, the MOV fault detection device further includes a neutral mis-wire ground protection coil N2, coupled with the MOV leak current detection coil to form a transformer coupling oscillator to generating oscillation when the neutral terminal of the line input is accidentally grounded.

In one embodiment, the trip circuit fault detection unit has: (i) a square wave signal generator circuit adapted for generating simulated ground fault square wave during positive or negative half cycle of the line input, and (ii) a trip circuit status electrical current path for generating a corresponding trip circuit status signal and the second trigger signal when a fault exists in the trip circuit.

In one embodiment, the square wave signal generator includes: (i) a tenth diode having an anode connected to the phase terminal of the line input and a cathode, (ii) a tenth resistor having a first terminal connected to the cathode of the tenth diode and a second terminal, (iii) a eleventh resistor having a first terminal and a second terminal, wherein the first terminal of the eleventh resistor is connected to the second terminal of the tenth resistor and the second terminal of the eleventh resistor is connected to the neutral terminal of the line input through a leak current detection coil, and (iv) a zener diode having an anode connected to the neutral terminal of the line input, and a cathode connected to the second terminal of the tenth resistor and the first terminal of the eleventh resistor.

In one embodiment, the trip circuit status electrical current path has a first and a second branches of an unsymmetrical bridge rectifying circuit. The first branch includes: (a) a first diode having an anode and a cathode, with its anode connected to the phase terminal of the line input and its cathode connected to the first terminal of the trip circuit, (b) the trip coil of the trip circuit, (c) the sixth SCR of the trip circuit, (d) the current limiting fifth resistor of the trip circuit, and (e) a second diode having an anode and a cathode, with its anode connected to the second terminal of the fifth resistor and its cathode connected to the neutral terminal of the line input. The second branch has: (a) a third diode having an anode and a cathode, with its anode connected to the neutral terminal of the line input and its cathode connected to the first terminal of the trip circuit, (b) the trip coil of the trip circuit, (c) the sixth SCR of the trip circuit, (d) a fourth diode having an anode and a cathode, with its anode connected to the second terminal of the trip circuit, and its cathode connected to the phase terminal of the line input. In operation, when the trip circuit is working under a predetermined working condition and the square wave signal generator generates simulated square wave ground fault signal, a voltage difference is generated across the fifth resistor of the first branch of the trip circuit status electrical current path, indicating said predetermined working condition.

In one embodiment, the fault reaction unit includes: (i) an MOV fault display unit for indicating the fault of the MOV of the ground fault circuit interrupter, and (ii) a trip circuit fault display unit for indicating the fault of the trip circuit of the ground fault circuit interrupter.

In one embodiment, the MOV fault display unit has: (i) a ninth light emitting diode (LED) having an anode and a cathode connected to the neutral terminal stationary contact point of the load output, (ii) a ninth resistor having a first terminal and a second terminal, wherein the first terminal of the ninth resistor is connected to the phase terminal stationary contact point of the load output, and the second terminal of the ninth resistor is connected to the anode of the ninth light emitting diode. When a fault of the MOV occurs and when the ground fault circuit interrupter is reset, the defected MOV causes the current imbalance between the phase terminal and the neutral terminal of the line input. The current imbalance then causes a voltage on the input terminal of the processor through a first resistor. When the voltage at the input terminal of the processor is greater than a predetermined threshold, the processor sends out the first trigger signal to the trip circuit to disconnect the movable contact points and the stationary contact points of the load output, and to turn off the ninth LED, indicating the fault of the MOV.

In one embodiment, the trip circuit fault display unit has: (i) a current limiting eighth resistor having a first terminal connected to the neutral terminal of the line input and a second terminal, (ii) a seventh SCR having an anode, a cathode and a gate terminal, wherein the gate terminal of the seventh SCR is connected to the second trigger signal, and the anode of the seventh SCR is connected to the second terminal of the eighth resistor, and (iii) an eighth light emitting diode having an anode and a cathode, wherein the anode of the eighth light emitting diode is connected to the cathode of the seventh SCR, and the cathode of the eighth light emitting diode is connected to the first terminal of fifth resistor. During the half cycle when the AC voltage on phase terminal of the line input is positive, and when a fault exists in one of the MOV leak current detection coils, the processor of the ground fault circuit interrupter, the trip coil, and the sixth SCR, the trip circuit fault display unit receives the second trigger signal causing the seventh SCR to be conductive, and the LED to be lit, indicating at least one fault condition of the trip circuit.

The self fault-detection circuit of claim 10, wherein the second trigger signal is generated due to the absence of a negative voltage across the fifth resistor when a fault exists in one of the MOV leak current detection coils, the processor of the ground fault circuit interrupter, the trip coil, and the sixth SCR.

In another aspect, the present invention relates to a self fault-detection method for a ground fault circuit interrupter device. In one embodiment, the method includes following steps: (i) detecting a fault in an MOV of the ground fault circuit interrupter with an MOV fault detection unit, (ii) detecting a fault in a trip circuit of the ground fault circuit interrupter with a trip circuit fault detection unit, and (iii) alerting a user of the ground fault circuit interrupter with an alarm.

In one embodiment, the step of alerting the user of the ground fault circuit interrupter with the alarm when at least one fault is detected in the MOV of the ground fault circuit interrupter includes the step of: (i) turning off a green LED that is used to indicate a normal working condition of the ground fault circuit interrupter when the LED is lit.

In one embodiment, the step of alerting the user of the ground fault circuit interrupter with the alarm when at least one fault is detected in the trip circuit of the ground fault circuit interrupter, includes the step of turning on a red LED indicating the faulty condition of the trip circuit of the ground fault circuit interrupter.

In one embodiment, the MOV fault detection unit and the trip circuit fault detection unit detect faults during the half cycle when the AC voltage on the phase terminal of the line input is positive. The ground fault circuit interrupter detects any ground faults during the half cycle when the AC voltage on the neutral terminal of the line input is positive.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment, and wherein.

DETAILED DESCRIPTION OF THE PRESENT INVENTION

Figure 1:
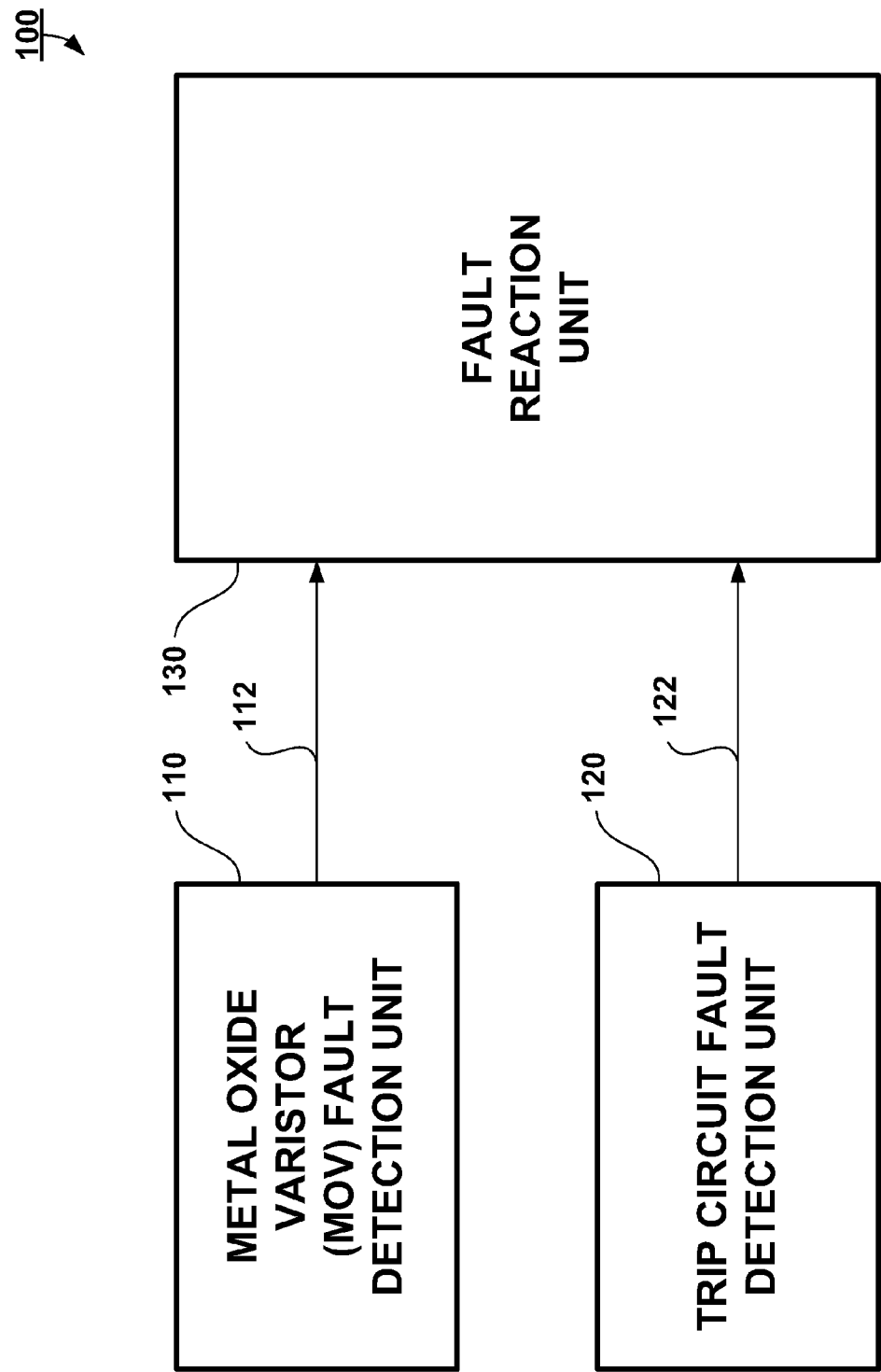
FIG. 1 shows a block diagram of a self fault-detection circuit for ground fault circuit interrupter according to one embodiment of the present invention.

The present invention is more particularly described in the following examples that are intended as illustrative only since numerous modifications and variations therein will be apparent to those skilled in the art. Various embodiments of the invention are now described in detail. Referring to the drawings, like numbers indicate like parts throughout the views. As used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which has no influence on the scope of the invention. Additionally, some terms used in this specification are more specifically defined below.

DEFINITIONS

The terms used in this specification generally have their ordinary meanings in the art, within the context of the invention, and in the specific context where each term is used.

Certain terms that are used to describe the invention are discussed below, or elsewhere in the specification, to provide additional guidance to the practitioner in describing the apparatus and methods of the invention and how to make and use them. Whether or not a term is capitalized is not considered definitive or limiting of the meaning of a term. As used in the description herein and throughout the claims that follow, a capitalized term shall have the same meaning as an uncapitalized term, unless the context of the usage specifically indicates that a more restrictive meaning for the capitalized term is intended. It will be appreciated that the same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and in no way limits the scope and meaning of the invention or of any exemplified term. Likewise, the invention is not limited to various embodiments given in this specification. Furthermore, subtitles may be used to help a reader of the specification to read through the specification, which the usage of subtitles, however, has no influence on the scope of the invention.

As used herein, the terms "unit" and "circuit" are interchangeable, and refer to a configuration of electrically or electromagnetically electrically coupled components or devices.

The term "switch" or "switching device", refers to a device for changing the course (or flow) of a circuit, i.e., a device for making or breaking an electric circuit, or for selecting between multiple circuits. As used herein, a switch or switching device has two states: a conductive state and a non-conductive state. When the switching device is in the conductive state, a current is allowed to pass through. When the switching device is in the non-conductive state, no current is allowed to pass through.

As used herein, short names, acronyms and/or abbreviations "AC" refers to alternate current; "DC" refers to direct current; "AFCI" refers to arc fault circuit interrupter; "GFCI" refers to ground fault circuit interrupter; "LED" refers to light emitting diode; and "SCR" refers to silicon controlled rectifier.

OVERVIEW OF THE INVENTION

The present invention, among other things, discloses a self fault-detection circuit for a ground fault circuit interrupter. A ground fault circuit interrupter (GFCI) has a pair of line input terminals and a pair of load output terminals. Each pair includes a phase terminal and a neutral terminal, respectively. The connection between the line input and the load output is made by a trip switch. This trip switch has two movable contact points and two stationary contact points for connecting phase and neutral terminals respectively. When the trip switch is in a conductive state, the first line input terminal is electrically coupled to the first load output terminal and the second line input terminal is electrically coupled to the second load output terminal, respectively. When the trip switch is in a non-conductive state, the first and second LINE terminals are electrically decoupled from the first and second LOAD terminal, respectively.

The trip switch is controlled by a trip circuit and the trip circuit includes a trip coil and a silicon controlled rectifier (SCR). In such a device, when a ground fault or an arc fault occurs, the conduction of the current through the SCR must be guaranteed. Otherwise, the trip circuit is broken and the trip mechanism fails to operate properly.

The trip switch is operated by the trip coil. When the trip coil is set in its conductive state, a current is allowed to pass through to cause the trip switch to be in conductive state, hence connecting the AC power connection between the line input and the load output. When the trip switch is set in its non-conductive state, a current is not allowed to pass through to cause the trip switch to be in non-conductive state, hence disconnecting the AC power connection between the line input and the load output.

Therefore, the trip circuit is important to the proper operation of the GFCI. On the other hand, a metal oxide varistor (MOV) is used to detect a surge of voltage to the GFCI and disconnecting the GFCI line input to the GFCI load output. It is also important. In order to ensure the proper operation of the GFCI, we need to ensure that both MOV and the trip circuit are in proper working condition. According to the present invention, the self fault-detection circuit detects faults with the MOV and trip circuit within the GFCI, and gives visual indication of its working condition. When the GFCI is in good working condition, a green LED is lit and a red LED is not lit. When the MOV circuit contains a fault condition, the green LED will be turned off and the AC power from the line input terminals to the load output terminals is disconnected. When the trip circuit has a fault condition, the green and red LEDs are lit, and the AC power from the line input terminals to the load output terminals is still connected. When both MOV and the trip circuit are in fault conditions, then the green LED is turned off, and the red LED is lit, and the AC power from the line input terminals to the load output terminals is disconnected.

These and other aspects of the present invention are further described below.

IMPLEMENTATIONS AND EXAMPLES OF THE INVENTION

Without intent to limit the scope of the invention, exemplary configurations and their related results according to the embodiments of the present invention are given below. Note again that titles or subtitles may be used in the examples for convenience of a reader, which in no way should limit the scope of the invention.

Figure 2:
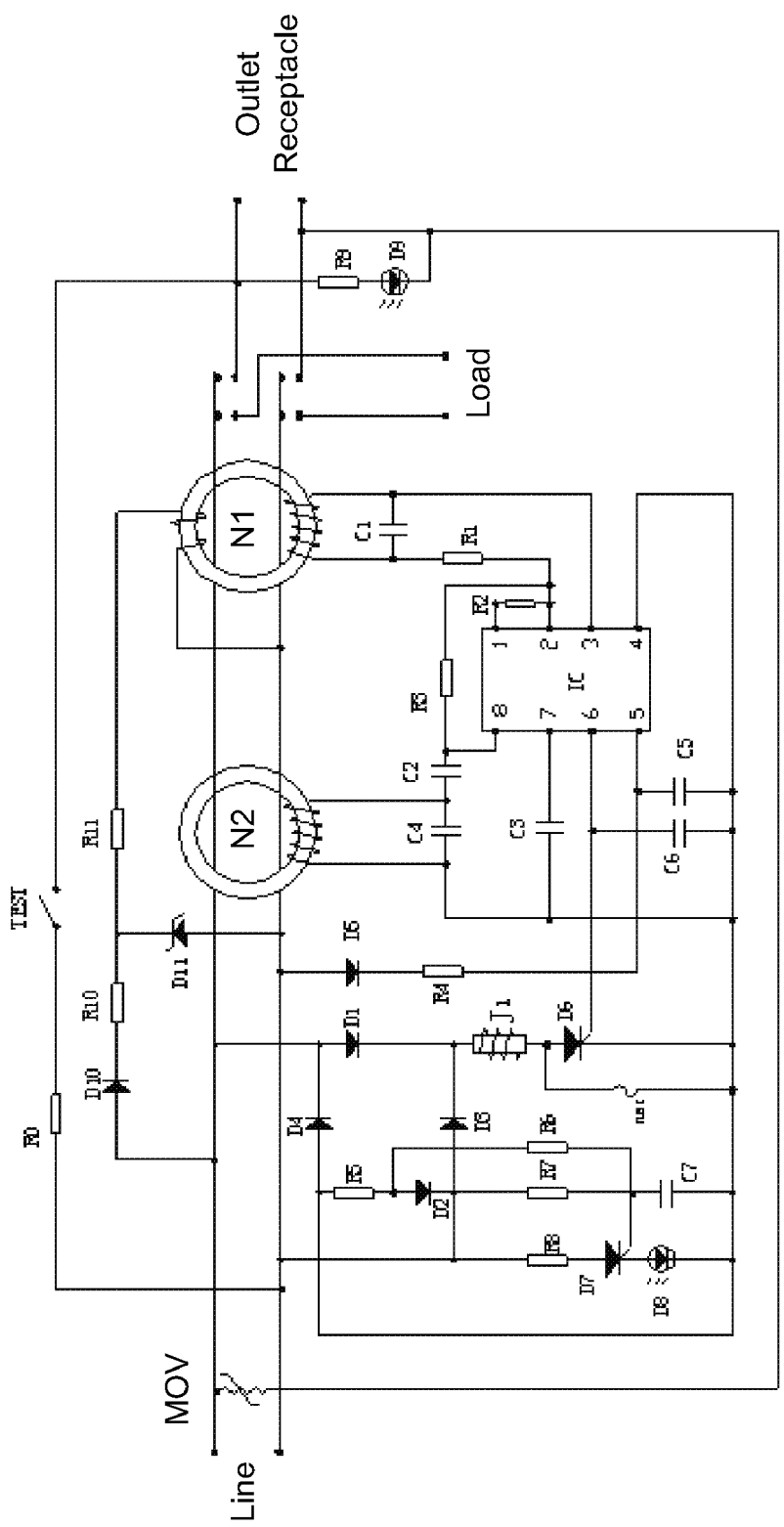
FIG. 2 shows a circuit diagram of a ground fault circuit interrupter with a self fault detection circuit according to one embodiment of the present invention.

Referring to FIGS. 1 and 2, and first to FIG. 1, a block diagram of a self fault-detection circuit for ground fault circuit interrupter is shown according to one embodiment of the present invention. The self fault-detection circuit for ground fault circuit interrupter 100 includes a metal oxide varistor (MOV) fault detection unit 110, a trip circuit fault detection unit 120, and fault reaction unit 130. When the MOV fault detection unit 110 detects a fault condition, the MOV fault detection unit 110 sends out a first trigger signal 112 to the fault reaction unit 130. When the trip circuit fault detection unit 120 detects a fault condition, the trip circuit fault detection unit 120 sends a second trigger signal 122 to the fault reaction unit 130. The fault reaction unit 130 receives one or more trigger signals from these two fault detection units and responds with an action to indicate that the GFCI has at least one fault condition.

FIG. 2 shows a circuit diagram of a ground fault circuit interrupter with a self fault detection circuit according to one embodiment of the present invention. The trip circuit of the ground fault circuit interrupter includes: (i) a trip coil J1 with a first terminal and a second terminal, with its first terminal forming a first terminal of the trip circuit, (ii) a sixth silicon controlled rectifier (SCR) D6 having an anode connected to the second terminal of the trip coil, a cathode and a gate, and (iii) a current limiting fifth resistor R5 having a first terminal and a second terminal, with its first terminal connected to the cathode of the sixth SCR D6, and the second terminal forming a second terminal of the trip circuit. The value of the fifth resistor R5 is chosen such that the current through the trip circuit is not strong enough to cause the trip coil J1 to trip.

In one embodiment, the MOV fault detection unit has: (i) the MOV having a first terminal and a second terminal, with its first terminal connected to the phase terminal of the line input, and its second terminal connected to the neutral terminal of the line input through a movable contact point and a stationary contact point, with the connection between the movable contact point and the stationary contact point controlled by the trip circuit, and (ii) an MOV fault detection device. The MOV fault detection device includes (a) an MOV leak current detection coil N1 adapted for detecting the leak current going through the MOV, and (b) a processor IC adapted for receiving the detected leak current from the MOV, comparing the detected leak current with a predetermined threshold and sending out the first trigger signal 112 if the detected leak current from the MOV is greater than the predetermined threshold.

In one embodiment, the MOV fault detection unit further has a neutral mis-wire ground protection coil N2. The neutral mis-wire ground protection coil N2 is combined with the MOV leak current detection coil N1 to form a transformer coupling oscillator. When the neutral terminal of the line input is accidentally grounded, this transformer coupling oscillator generates oscillation. This oscillation is sent to the processor IC and processor IC causes the trip circuit to disconnect the AC power from the line input to the load output.

In one embodiment, the trip circuit fault detection unit has: (i) a square wave signal generator circuit adapted for generating simulated ground fault square wave during the half cycle when the AC voltage on the phase terminal of the line input is positive, and (ii) a trip circuit status electrical current path for generating a corresponding trip circuit status signal and the second trigger signal 122 when a fault exists in the trip circuit.

The square wave signal generator includes: (a) a tenth diode D10 having an anode connected to the phase terminal of the line input and a cathode, (b) a tenth resistor R10 having a first terminal connected to the cathode of the tenth diode D10 and a second terminal, (c) an eleventh resistor R11 having a first terminal and a second terminal, with its first terminal connected to the second terminal of the tenth resistor R10 and its second terminal connected to the neutral terminal of the line input through a leak current detection coil N3, and (d) a zener diode D11 having an anode connected to the neutral terminal of the line input and a cathode connected to the second terminal of the tenth resistor R10 and the first terminal of the eleventh resistor R11. The square wave signal generator generates a positive square wave signal only during the half cycle when the AC voltage on the phase terminal of the line input is positive, and will not have any signal during the during the half cycle when the AC voltage on the neutral terminal of the line input is positive.

In one embodiment, the trip circuit status electrical current path has a first branch and a second branche of an unsymmetrical bridge rectifying circuit. A current passes through the first branch during the half cycle when the AC voltage on the phase terminal of the line input is positive. This half cycle is called positive half cycle. A current passes through the second branch during the half cycle when the AC voltage on the neutral terminal of the line input is positive. This half cycle is called negative half cycle.

The first branch includes: (i) a first diode D1 having an anode connected to the phase terminal of the line input and a cathode connected to the first terminal of the trip circuit, (ii) the trip coil J1 of the trip circuit, (iii) the sixth SCR D6 of the trip circuit, (iv) the current limiting fifth resistor R5 of the trip circuit, and (v) a second diode D2 having an anode connected to the second terminal of the fifth resistor R5 and a cathode connected to the neutral terminal of the line input.

The second branch includes: (i) a third diode D3 having an anode connected to the neutral terminal of the line input and a cathode connected to the first terminal of the trip circuit, (ii) the trip coil J1 of the trip circuit, (iii) the sixth SCR D6 of the trip circuit, and (iv) a fourth diode D4 having an anode connected to the first terminal of the fifth resistor R5 and a cathode connected to the phase terminal of the line input.

When the trip circuit is working under a predetermined working condition and the square wave signal generator generates simulated square wave ground fault signal during the positive half cycle, the simulated ground fault signal is detected by the processor IC and the sixth SCR D6 is trigger to be conductive and a current passing through the first branch of the trip circuit status electrical current path generates a voltage difference over the fifth resistor R5. This voltage difference indicates that the trip circuit is working under said predetermined working condition.

When the trip circuit is working under the predetermined working condition during the positive half cycle, there will be no simulated ground fault signal and the sixth SCR D6 is not to be conductive.

In one embodiment, the fault reaction unit includes: (i) an MOV fault display unit for indicating the fault condition of the MOV of the ground fault circuit interrupter, and (ii) a trip circuit fault display unit for indicating the fault condition of the trip circuit of the ground fault circuit interrupter.

In one embodiment, the MOV fault display unit includes: (i) a ninth light emitting diode (LED) D9 having an anode connected to the neutral terminal stationary contact point of the load output and a cathode, and (ii) a ninth resistor R9 having a first terminal connected to the phase terminal stationary contact point of the load output and a second terminal connected to the anode of the ninth light emitting diode D9. When a fault of the MOV of the ground fault circuit interrupter occurs and when the ground fault circuit interrupter is reset, the defected MOV causes the current imbalance between the phase terminal and the neutral terminal of the line input. The current imbalance then causes a voltage on the input terminal of the processor IC through a first resistor R1. When the voltage at the input terminal of the processor IC is greater than a predetermined threshold, the processor sends out the first trigger signal 112 to trip circuit to disconnect the movable contact points and the stationary contact points of the load output, and to turn off the ninth light emitting diode D9, indicating the fault condition of the MOV of the ground fault circuit interrupter.

In one embodiment, the trip circuit fault display unit includes: (i) a current limiting eighth resistor R8 having a first terminal and a second terminal, with its first terminal connected to the neutral terminal of the line input, (ii) a seventh SCR D7 having an anode, a cathode and a gate terminal, with its gate terminal connected to the second trigger signal 122, and its anode connected to the second terminal of the eighth resistor, and (iii) an eighth light emitting diode D8 having an anode and a cathode, with its anode connected to the cathode of the seventh SCR, and its cathode connected to the first terminal of fifth resistor. When a fault exists in one of the MOV leak current detection coils, the processor IC of the ground fault circuit interrupter, the trip coil J1, and the sixth SCR D6, the trip circuit fault display unit receives the second trigger signal 122 causing the seventh SCR to be conductive, and the LED D8 to be lit, indicating at least one fault condition of the trip circuit. The second trigger signal 122 is generated due to the absence of a negative voltage across the fifth resistor when a fault exists in one of the MOV leak current detection coils, the processor IC of the ground fault circuit interrupter, the trip coil J1, and the sixth SCR D6.

When the trip circuit works under a predetermined working condition during the positive half cycle, the square wave signal generator generates simulated square wave ground fault signal during the positive half cycle, the simulated ground fault signal is detected by the processor IC and the sixth SCR D6 is trigger to be conductive and a current passing through the first branch of the trip circuit status electrical current path generates a voltage difference over the fifth resistor R5. This voltage difference indicates that the trip circuit is working under said predetermined working condition. The positive cycle is used to detect faults in the trip circuit. Because the existence of the fifth resistor R5, and its value is selected very high such that the current passing through the first branch of the trip circuit status electrical current path is in the order of mA, and not strong enough to cause the trip coil J1 to disconnect the AC power line and the load output.

When one or more of the key components such as the MOV leak current detection coil N1, the processor IC of the ground fault circuit interrupter, the trip coil J1, and the sixth SCR D6, fail to operate properly, there will be no current passing through the first branch of the trip circuit status electrical current path. Then a second trigger signal 122 is generated through a sixth resistor R6 and a seventh resistor R7, and the second trigger signal 122 is then sent to the gate terminal of the seventh SCR D7. The second trigger signal 122 causes the seventh SCR D7 to be conductive and therefore turns on the eighth LED D8, indicating the fault condition of the trip circuit of the ground fault circuit interrupter.

When the trip circuit works under a predetermined working condition during the negative half cycle, a current passes through the second branch of the trip circuit status electrical current path. If there is no ground fault, the second branch is closed since the sixth SCR is not conductive. If a ground fault is detected by the MOV leak current detection coil N1, the leak current is detected by the processor IC and the sixth SCR D6 is trigger to be conductive. A current passes through the second branch of the trip circuit status electrical current path. Since the resistance of the second branch is much less than the first branch, the current is much stronger to cause the trip coil J1 to disconnect the AC power line input from the load output.

In another aspect, the present invention relates to a self fault-detection method for a ground fault circuit interrupter device. In one embodiment the method includes the steps of: (i) detecting a fault in an MOV of the ground fault circuit interrupter with an MOV fault detection unit, (ii) detecting a fault in a trip circuit of the ground fault circuit interrupter with a trip circuit fault detection unit, and (iii) alerting a user of the ground fault circuit interrupter with an alarm. When at least one fault is detected in the MOV of the ground fault circuit interrupter, a green LED usually indicating normal working condition of the ground fault circuit interrupter is turned off. When at least one fault is detected in the trip circuit of the ground fault circuit interrupter, a red LED indicating the faulty condition of the ground fault circuit interrupter is turned on.

In one embodiment, the MOV fault detection unit and the trip circuit fault detection unit detect faults during the half cycle when the AC voltage on the phase terminal of the line input is positive, while the ground fault circuit interrupter detects any ground faults during the half cycle when the AC voltage on the neutral terminal of the line input is positive.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A self fault-detection circuit for a ground fault circuit interrupter having a line input with a phase terminal and a neutral terminal, and a load output with a phase terminal and a neutral terminal, comprising:
   (i) a Metal Oxide Varistor (MOV) fault detection unit configured for detecting a fault condition of the MOV, and sending a first trigger signal if a fault condition of the MOV is detected;
   (ii) a trip circuit fault detection unit configured for detecting a fault condition of a trip circuit, and sending a second trigger signal if a fault condition of the trip circuit is detected, wherein the trip circuit comprises:
      a trip coil having a first terminal and a second terminal, wherein the first terminal of the trip coil forms a first terminal of the trip circuit;
      a sixth silicon controlled rectifier (SCR) having an anode connected to the second terminal of the trip coil, a cathode and a gate; and
      a current limiting fifth resistor having a first terminal and a second terminal, wherein the first terminal of the fifth resistor connected to the cathode of the sixth SCR, and the second terminal of the fifth resistor forming a second terminal of the trip circuit, wherein, the value of the fifth resistor is chosen such that the current through the trip circuit is not strong enough to cause the trip coil to trip; and
   (iii) a fault reaction unit for receiving the first trigger signal from the MOV fault detection unit and the second trigger signal from the trip circuit fault detection unit, and responding to the first and the second trigger signals with an action;
   wherein the MOV fault detection unit comprises:
      (a) an MOV having a first terminal and a second terminal, wherein the first terminal of the MOV is connected to the phase terminal of the line input, and the second terminal of the MOV is connected to the neutral terminal of the line input through a movable contact point and a stationary contact point, with the connection between the movable contact point and the stationary contact point controlled by the trip circuit;
      (b) an MOV fault detection device comprising:
         an MOV leak current detection coil adapted for detecting the leak current going through the MOV; and
         a processor adapted for receiving the detected leak current from the MOV, comparing the detected leak current with a predetermined threshold and sending out the first trigger signal if the detected leak current from the MOV is greater than the predetermined threshold; and
      (c) a neutral mis-wire ground protection coil N2, coupled with the MOV leak current detection coil to form a transformer coupling oscillator to generating oscillation when the neutral terminal of the line input is accidentally grounded;
   wherein the trip circuit fault detection unit comprises:
      (a) a square wave signal generator circuit adapted for generating simulated ground fault square wave during the half cycle when the AC voltage on the phase terminal of the line input is positive, wherein the square wave signal generator comprises:
         a tenth diode having an anode connected to the phase terminal of the line input and a cathode;
         a tenth resistor having a first terminal connected to the cathode of the tenth diode and a second terminal;
         an eleventh resistor having a first terminal and a second terminal, wherein the first terminal of the eleventh resistor is connected to the second terminal of the tenth resistor and the second terminal of the eleventh resistor is connected to the neutral terminal of the line input through a leak current detection coil; and
         a zener diode having an anode connected to the neutral terminal of the line input and a cathode connected to the second terminal of the tenth resistor and the first terminal of the eleventh resistor; and
      (b) a trip circuit status electrical current path for generating a corresponding trip circuit status signal and the second trigger signal when a fault exists in the trip circuit, wherein the trip circuit status electrical current path comprises a first and a second branches of an unsymmetrical bridge rectifying circuit,
         the first branch comprising:
            a first diode having an anode and a cathode, with its anode connected to the phase terminal of the line input and its cathode connected to the first terminal of the trip circuit;
            the trip coil of the trip circuit;
            the sixth SCR of the trip circuit;
            the current limiting fifth resistor of the trip circuit; and
            a second diode having an anode and a cathode, with its anode connected to the second terminal of the fifth resistor and its cathode connected to the neutral terminal of the line input; and
         the second branch comprising:
            a third diode having an anode and a cathode, with its anode connected to the neutral terminal of the line input and its cathode connected to the first terminal of the trip circuit;
            the trip coil of the trip circuit;
            the sixth SCR of the trip circuit; and
            a fourth diode having an anode and a cathode, with its anode connected to the second terminal of the trip circuit, and its cathode connected to the phase terminal of the line input,
   wherein, in operation, when the trip circuit is working under a predetermined working condition and the square wave signal generator generates simulated square wave ground fault signal, a voltage difference is generated across the fifth resistor of the first branch of the trip circuit status electrical current path, indicating said predetermined working condition; and
   wherein, in operation, when at least one of the first and the second trigger signals is received by the fault reaction unit, the fault reaction unit indicates that at least one fault exist in the ground fault circuit interrupter.

2. The self fault-detection circuit of claim 1, wherein the fault reaction unit comprises:
   (a). an MOV fault display unit for indicating the fault of the MOV of the ground fault circuit interrupter; and
   (b). a trip circuit fault display unit for indicating the fault of the trip circuit of the ground fault circuit interrupter.

3. The self fault-detection circuit of claim 2, wherein the MOV fault display unit comprises:
   (a). a ninth light emitting diode (LED) having an anode and a cathode connected to the neutral terminal stationary contact point of the load output; and
   (b). a ninth resistor having a first terminal and a second terminal, wherein the first terminal of the ninth resistor is connected to the phase terminal stationary contact point of the load output, and the second terminal of the ninth resistor is connected to the anode of the ninth light emitting diode,
   wherein, when a fault of the MOV of the ground fault circuit interrupter occurs and when the ground fault circuit interrupter is reset, the defected MOV causes a current imbalance between the phase terminal and the neutral terminal of the line input, the current imbalance then causes a voltage on the input terminal of the processor through a first resistor, when the voltage at the input terminal of the processor is greater than a predetermined threshold, the processor sends out the first trigger signal to the trip circuit to disconnect the movable contact points and the stationary contact points of the load output, and to turn off the ninth light emitting diode, indicating the fault of the MOV of the ground fault circuit interrupter.

4. The self fault-detection circuit of claim 3, wherein the trip circuit fault display unit comprises:
   (a). a current limiting eighth resistor having a first terminal connected to the neutral terminal of the line input and a second terminal;
   (b). a seventh SCR having an anode, a cathode and a gate terminal, wherein the gate terminal of the seventh SCR is connected to the second trigger signal, and the anode of the seventh SCR is connected to the second terminal of the eighth resistor; and
   (c). an eighth light emitting diode having an anode and a cathode, wherein the anode of the eighth light emitting diode is connected to the cathode of the seventh SCR, and the cathode of the eighth light emitting diode is connected to the first terminal of fifth resistor,
   wherein, during the half cycle when the AC voltage on phase terminal of the line input is positive, when a fault exists in one of the MOV leak current detection coils, the processor of the ground fault circuit interrupter, the trip coil, and the sixth SCR, the trip circuit fault display unit receives the second trigger signal causing the seventh SCR to be conductive, and the LED to be lit, indicating at least one fault condition exists in the trip circuit of the ground fault circuit interrupter.

5. The self fault-detection circuit of claim 4, wherein the second trigger signal is generated due to the absence of a negative voltage across the fifth resistor when a fault exists in one of the MOV leak current detection coils, the processor of the ground fault circuit interrupter, the trip coil, and the sixth SCR.

* * * * *